W. L. BLISS.
TAPER CHARGE CURRENT REGULATOR.
APPLICATION FILED APR. 29, 1911. RENEWED APR. 6, 1917.
1,246,853.  Patented Nov. 20, 1917.
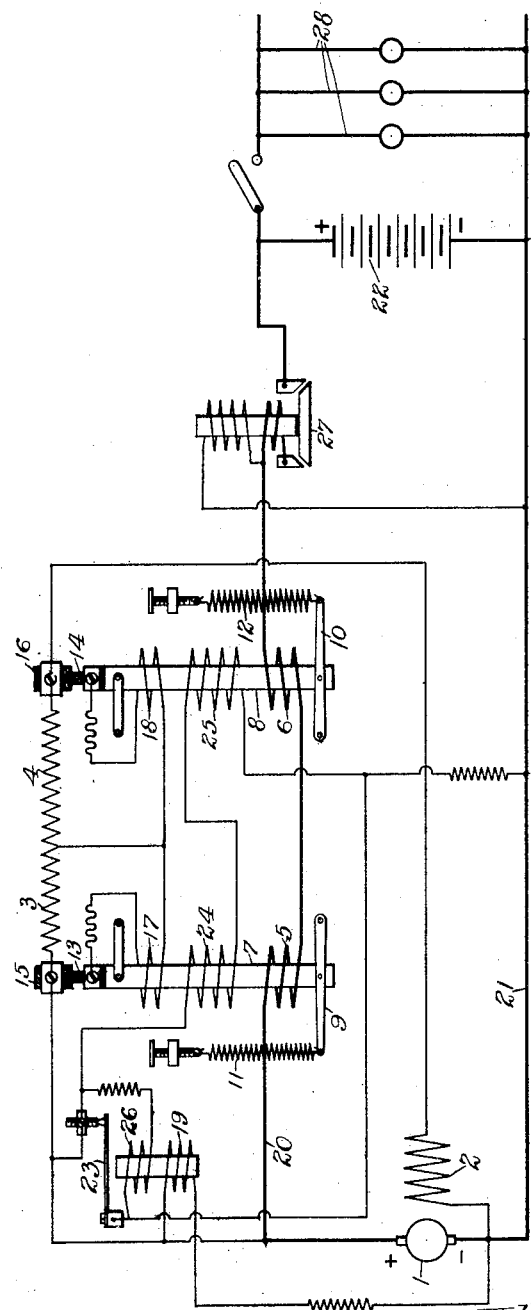

UNITED STATES PATENT OFFICE.

WILLIAM L. BLISS, OF NIAGARA FALLS, NEW YORK, ASSIGNOR, BY MESNE ASSIGNMENTS, TO U. S. LIGHT & HEAT CORPORATION, OF NIAGARA FALLS, NEW YORK, A CORPORATION OF NEW YORK.

TAPER-CHARGE CURRENT-REGULATOR.

1,246,853.     Specification of Letters Patent.     Patented Nov. 20, 1917.

Application filed April 29, 1911, Serial No. 624,113. Renewed April 6, 1917. Serial No. 160,307.

*To all whom it may concern:*

Be it known that I, WILLIAM L. BLISS, a citizen of the United States, residing at Niagara Falls, in the county of Niagara and State of New York, have invented new and useful Improvements in Taper-Charge Current-Regulators, of which the following is a full, clear, concise and exact description, reference being had to the accompanying drawing, forming a part of this specification.

My invention relates to a constant current regulator having a taper charge device, and to a system of electrical distribution employing such a regulator. One of the objects of my invention is to provide an improved regulator for preventing the current delivered by a generator from increasing beyond a predetermined value until the storage battery connected therewith has been charged to a predetermined voltage, but which will cause a gradual decrease in the battery charging current after said battery has become fully charged. Another object of my invention is to provide a regulator which will regulate within close limits and which will be stable in operation.

Certain broad features of the invention herein disclosed are described and claimed in my copending stop and taper charge applications, Serial Nos. 624,109 and 624,110.

The regulator is illustrated as applied to a car lighting system in which a variable speed generator is employed for charging the storage battery. Of course the regulator may be used with other systems.

In the car lighting system illustrated diagrammatically in the drawings, I have shown a generator having an armature 1 and a shunt field winding 2, having in series therewith the two resistances 3 and 4, one of which is preferably greater than the other. The operation of the regulator is controlled by two series windings 5 and 6. Each winding or solenoid is provided with a core 7, 8, the lower ends of which are attached to pivoted levers 9, 10, normally drawn up by springs 11, 12, spring 12 having preferably a stronger pull than spring 11. Both springs may have their tensions adjusted by the adjustable nuts to which they are secured.

The cores 7, 8, are adapted to vibrate rapidly, as hereinafter described, and each carries a contact member or electrode 13, 14 at the upper end adapted to coöperate with the corresponding fixed electrodes 15, 16 to short circuit the corresponding resistances 3, 4.

Auxiliary coils 17, 18 are connected in series with the generator shunt field and in parallel with the resistances 3, 4. A voltage responsive coil 19 is connected across the main circuit 20, 21, and is adapted upon predetermined rise in the counter-electromotive force of the battery 22 to vibrate the resilient short circuiting contact arm 23, which normally short circuits the voltage responsive solenoids 24 and 25 associated with the cores 7 and 8. The auxiliary coil 26 is provided to accelerate the vibrations of the resilient member 23 by compensating for the varying reluctance of the air gap. The automatic switch 27 is adapted to close the external circuit to the storage battery 22 and to the lamp circuit 28 connected in parallel branch with said battery.

The operation of the system is substantially as follows: When the generator is at rest, the automatic switch is open, and the battery carries the lamp load, if any lamps are connected in circuit. The resistances 3 and 4 are short circuited so that the generator field resistance is a minimum. When the generator begins to excite itself, due to rotation of the armature, its voltage increases with the speed until it is about equal to or somewhat in excess of the battery voltage. At this point the automatic switch closes. The generator now charges the storage battery and carries the lamp load, if any.

If the generator current tends to increase above a certain value, the series coil 5 separates the short circuiting contacts 13 and 15 thereby introducing the resistance 3 into the generator field circuit. The increased field resistance reduces the generator current, permitting spring 11 to raise the core 7 and again short circuit the resistance 3. This cycle of operation is repeated rapidly upon continuing tendency toward current increase. The time lag of the field winding 2 prevents it from responding fully to the fluctuations imposed by the rapid short circuiting of the resistance 3. The mean value of the magnetizing current in said field coils, however, varies to correspond to the character of the vibrations which in turn respond to the variations in current in the series coil. Upon increased tendency of the generator current to rise, the character of the vibrations changes, so that the resistance 3 is introduced into circuit for successively longer intervals of time, and upon reduction in the generator current the reverse operation takes place. If the generator current tends to increase even higher then, as explained above, the core 7 is held down by the series coil 5 against the action of the spring, so that the resistance 3 is in circuit continuously, the energizaton of the second series coil 6 increasing to overcome the pull of the stronger spring 12, whereby the core 8 is rapidly vibrated to introduce the larger resistance 4 into the generator field circuit in addition to the resistance 3. The two resistances and the two sets of vibrating contacts are sufficient to confine the generator output under ordinary circumstances. It is apparent, however, that a greater or less number of resistances and short circuiting contacts may be introduced, if desired, to meet varying requirements.

The purpose of the auxiliary coils 17 and 18 is to accelerate the vibrations of the cores. These auxiliary coils assist the series coils in opening the short circuit around the resistances, but are deënergized as soon as said short circuits are opened, thereby permitting the spring to return the respective cores quickly to short circuiting position. It is apparent that these auxiliary coils may be connected in a variety of ways to accelerate the vibrations.

When the battery approaches a fully charged condition, the pronounced rise in the counter-electromotive force thereof causes a corresponding increase in the generator voltage and the voltage coil 19 starts the vibration of the resilient member or reed 23. This introduces voltage responsive solenoids 24 and 25 into the circuit for very short successive intervals of time. As the voltage of the system continues to rise, the character of the vibrations of resilient member 23 changes, so that the shunt solenoids 24 and 25 are in circuit for increasingly longer intervals of time whereby their magnetization is gradually increased. The effectiveness of the series windings 5 and 6 begins to decrease with the energization of shunt windings 24 and 25, as the tendency of the regulation is to maintain constant the number of ampere turns effective in controlling the vibrating cores. As the voltage continues to rise, the current in the external circuit of the generator is very rapidly decreased, due to the action described, and due also to the fact that not only are the shunt solenoids in circuit for longer intervals of time, but the current flowing there-through during said longer intervals is of increasing value, whereby a doubly increased magnifying effect is produced. Consequently, the battery charging current is rapidly reduced or tapered at the desired rate until said current is almost zero, provided no lamps are in circuit. With lamps connected in circuit, the current is reduced to substantially the value necessary to maintain the lamp load. The effect of the taper charge relay is to change the character of the regulation of the system from current regulation to predominating voltage regulation. After the battery has become fully charged, the shunt solenoids prevent the generator voltage from exceeding a predetermined maximum.

The auxiliary coil 26 increases the rapidity of the vibration of resilient reed 23. This coil is normally short circuited by the reed 23. When said reed is drawn down said coil is energized and opposes the voltage coil 19, thereby permitting the reed to spring back and again close the short circuit more quickly than would otherwise occur. The function of the auxiliary coil being to compensate for the varying reluctance of the air gap, it is apparent that this coil may be connected in circuit in a variety of ways to accomplish the desired result.

If the speed of the generator armature, and consequently the generator voltage, begins to decrease, the vibration of the reed 23 eventually ceases, and upon still further voltage reduction, the battery will discharge through the series winding of the automatic switch and open the same. The system will now be in the condition first described, with the lamp load carried by the battery.

When the generator armature is driven from a car axle, the rotation thereof may be in either direction, depending upon the direction of travel of the car. Any suitable pole changing device (not shown) may be provided to maintain the proper polarity of the generator external circuit, thereby insuring the charging of the storage battery in the proper direction.

It is apparent that I do not desire to limit myself to the details of construction described herein, nor to the details of the system selected for the purpose of illustration, but desire to include broadly any suitable means for accomplishing the desired results and falling within the scope of the appended claims.

I claim as my invention—

1. In a car lighting system, a variable speed generator having a shunt field winding, a main circuit extending therefrom, a storage battery and lamps connected across said main circuits in parallel branches, a resistance for regulating the field strength of the generator and connected in circuit with said winding, a short circuit adapted to be completed around said resistance, a pair of separable electrodes for controlling said resistance, a series winding arranged in said main circuit for vibrating one of said electrodes to control said short circuit whereby the field strength of said generator is reduced as the output thereof tends to increase, a shunt winding also adapted to vibrate said electrodes to regulate said generator for constant voltage and a taper charge relay connected across said circuit and adapted upon prearranged rise in counter-electromotive force of said battery to gradually increase the effectiveness of said shunt winding, whereby said generator current is gradually reduced to taper off the battery charging current until said generator is regulated substantially for constant voltage.

2. In a car lighting system, a variable speed generator having a shunt field winding, a plurality of resistances arranged in circuit therewith, a plurality of make and break devices each adapted to short circuit one of said resistances, a plurality of series coils in the external field of the generator for operating said make and break devices to regulate the current delivered by said generator, one of said make and break devices being adjusted to operate only in response to a greater current increase in its corresponding coil than the other of said make and break devices, a plurality of voltage responsive coils connected across said external circuit, and adapted when energized, to operate said make and break devices to regulate the voltage of said generator, a vibratile reed normally short circuiting said voltage coils whereby said system is regulated for constant current, and an additional voltage responsive coil adapted upon predetermined continued voltage rise of the system to increasingly vibrate said reed whereby said first-mentioned voltage responsive coils are introduced into the circuit for increasing intervals of time to provide mixed voltage and current regulation for said system with the voltage regulation gradually increasing until the current regulation is substantially annuled.

3. Means for regulating a shunt-wound generator, said means including a resistance, a pair of separable electrodes for controlling said resistance, a series winding responding to generator current and arranged to control the separation of said electrodes whereby the current delivered by the generator is maintained substantially constant, a shunt winding also adapted to control the separation of said electrodes but normally inert, and a taper charge device for gradually increasing the energization of said shunt winding, whereby the energization of said series winding is rapidly decreased and whereby the generator regulation is changed from constant current regulation to predominating constant voltage regulation.

4. Means for regulating a shunt-wound generator, said means including a plurality of resistances, a plurality of vibrating electrodes for short circuiting said resistances, one for each resistance, a plurality of series windings in the external circuit of the generator, each adapted to vibrate one of said electrodes, a plurality of voltage responsive windings in series with each other and connected in shunt across said external circuit, a taper charge relay device adapted upon predetermined voltage rise of the circuit to permit the energization of said voltage responsive windings with increasing effectiveness for gradually reducing the effectiveness of said series windings, whereby said generator regulation is gradually changed from current regulation to predominating voltage regulation.

5. Means for regulating a shunt-wound generator, said means including a solenoid having its core mounted upon pivoted arms to permit rapid vibration, a resistance adapted to be connected in the shunt field circuit of the generator, a pair of electrodes connected in circuit to short circuit said resistance, one of said electrodes being mounted upon said core, a spring for normally maintaining said electrodes in contact to short circuit said resistance, said solenoid comprising a winding in series in the generator circuit and a winding in shunt across said generator circuit, and a taper charge relay for permitting the energization of said shunt connected winding upon predetermined voltage rise of said generator, said taper charge relay comprising a voltage responsive coil, a vibratile short circuiting reed controlled thereby and an auxiliary coil for accelerating the vibrations of said reed.

6. Means for regulating a variable speed shunt field generator, including in combination with the generator field a resistance adapted for connection in circuit with said field, a series connected coil and a shunt connected coil associated with the generator circuit, a vibrating member adapted to respond to the energization of either or both of said coils, contacts associated with said member whereby the vibration thereof short circuits said resistance with such rapidity that the lag of the generator field prevents variation in field strength corresponding to the full value of the variations in said resistance, and a voltage responsive vibratile member associated with said circuit to normally short circuit said shunt connected coil but to permit its energization upon predetermined voltage rise of the system whereby said system upon increasing voltage thereof is provided successively with current regulation, mixed regulation and voltage regulation substantially.

7. Means for regulating a generator, said means including a resistance, a pair of separable electrodes for controlling said resistance, a series winding responding to generator current and arranged to vibrate said electrodes relatively to each other whereby the current delivered by the generator is maintained substantially constant, an auxiliary coil connected across said vibrating contacts to accelerate the vibrations, a shunt winding also adapted to vibrate said electrodes but normally inert, and a taper charge device for gradually increasing the energization of said shunt winding, whereby the energization of said series winding is rapidly decreased and whereby the generator regulation is changed from constant current regulation to predominating constant voltage regulation.

8. Means for regulating a variable speed car lighting generator, said means including a vibratory contact, a winding in series with the generator adapted to vibrate said contact to regulate said generator for substantially constant current, an additional coil adapted when energized to assist said series coil and thereby cause a less value of current in said series coil to operate said vibratory contact, and a relay responsive to the voltage of said generator adapted to cause an increase in energization of said additional coil as the voltage of the generator tends to rise, whereby said vibratory contact may be operated by decreasing current in said series coil upon a tendency of the generator voltage to rise.

9. A regulator for a car lighting system including a vibratory regulator, a series coil for vibrating said regulator in response to a predetermined current value in the system, an additional coil adapted when energized to assist said series coil whereby said series coil may vibrate said regulator when less than said predetermined value of current is flowing, and a relay responsive to the voltage of the system for causing an increasing energization of said additional coil as the voltage of the system tends to rise whereby said series coil may vibrate said regulator in response to a decreasing current whenever the voltage tends to rise.

10. Regulating means for a car lighting system, including a vibratory contact, a current coil for causing said contact to vibrate when a predetermined current flows in the system, means to cause said current coil to vibrate said contact when less than said predetermined current is flowing and means responsive to electrical conditions in the system to cause said first means to have an increasing aiding effect as the voltage of the system tends to rise, whereby said contact may be vibrated by a decreasing current in said current coil.

11. In combination, a variable speed shunt wound generator, a storage battery to be charged thereby, a vibratory contact for controlling the field excitation of said generator, a coil responsive to variations in current in the system for vibrating said contact, a second coil which when energized assists said current coil and a relay responsive to a predetermined voltage in the system to cause energization of said second coil when a predetermined voltage is reached, and also acting to cause an increasing energization of said coil as the voltage tends to rise at the completion of the charge of said battery, whereby the battery charging current is tapered.

In witness whereof, I have hereunto subscribed my name in the presence of two witnesses.

WILLIAM L. BLISS.

Witnesses:
  Geo. B. Jones,
  Max M. Oppenheim.

Copies of this patent may be obtained for five cents each, by addressing the "Commissioner of Patents, Washington, D. C."